United States Patent

[11] 3,585,530

[72] Inventor Wallace W. Wahlgren
Oakland, Calif.
[21] Appl. No. 802,983
[22] Filed Feb. 27, 1969
[45] Patented June 15, 1971
[73] Assignee The Rucker Company
Oakland, Calif.

[54] INDUCTION COUPLED AMPLITUDE MODULATION SYSTEM
8 Claims, 2 Drawing Figs.

[52] U.S. Cl. 332/43, 332/49, 332/51, 332/60, 332/64
[51] Int. Cl. H03c 1/10
[50] Field of Search 332/41, 42, 49, 60, 64, 51, 43, 43 B

[56] References Cited

UNITED STATES PATENTS

| | | | |
|---|---|---|---|
| 1,923,543 | 8/1933 | Lawrence | 332/49 |
| 2,189,897 | 2/1940 | Gutzmann et al. | 332/41 X |
| 2,432,512 | 12/1947 | Davis | 332/60 X |
| 2,436,066 | 2/1948 | Favre | 332/49 X |
| 2,939,090 | 5/1960 | Ellis | 332/49 |

*Primary Examiner*—Alfred L. Brody
*Attorney*—Flehr, Hohbach, Test, Albritton and Herbert

ABSTRACT: A system for coupling the output of a modulating amplifier to a radio frequency amplifier, requiring no blocking capacitor and utilizing separate modulation transformer and modulation reactor units to isolate the modulation transformer from heavy direct currents. In one embodiment, the system includes an auxiliary modulation transformer for simultaneous modulation of multiple electrodes in two or more RF amplifier stages.

INVENTOR.
WALLACE W. WAHLGREN

BY Flehr, Hohbach, Test, Albritton & Herbert
ATTORNEYS

INDUCTION COUPLED AMPLITUDE MODULATION SYSTEM

BACKGROUND OF THE INVENTION

In recent years, with the advent of high-powered tetrode and pentode vacuum tubes, designers of amplitude modulated transmitters have encountered serious difficulties in connecting the output of a high level audio amplifier into a high-powered radio frequency amplifier to provide modulation of the radio frequency signal therein.

A typical amplitude modulated transmitter includes two amplifier systems: a radio frequency system and an audio system. The radio frequency system generally includes a radio frequency signal source, such as an oscillator, and a series of circuits for amplifying the radio frequency signal and delivering it to an antenna from which it is radiated. The audio frequency system includes a series of amplifiers for increasing the output from audio sources, such as microphones, phonograph pickups tape heads and the like, to a power level of approximately one-half the rated transmitter output. Modulation of the radio frequency signal is accomplished by coupling the output of the audio system to the output stage of the radio frequency system so that the radio frequency energy delivered to the antenna increases and decreases in accordance with the audio signals.

In high-powered transmitters heretofore provided, the audio output is generally coupled to the radio frequency amplifier by means of a modulation transformer and modulation reactor, together with a blocking capacitor for keeping the direct current supplied to the radio frequency amplifier out of the secondary winding on the modulation transformer.

In some low-powered transmitters, the modulation transformer and reactor have been combined into a single unit and the blocking capacitor has been eliminated, with the plate current of the radio frequency amplifier flowing through the secondary winding of the combination transformer-reactor. This system would appear to provide an ideal means for injecting audio power into the radio frequency amplifier except for difficulties and limitation that arise in practical applications of this system. The transformer-reactor is required to perform three entirely different functions ideally and simultaneously. First, in high power electronic amplifiers, it is well known that a push-pull arrangement of amplifier tubes or transistors is desirable for high quality full wave power generation. The primary windings of output transformers used with push-pull amplifiers must be electrically equal and balanced to a high degree and at the same time they must also be properly coupled to prevent the distortion of signals. This necessitates a primary winding of considerable size. Secondary, since the core and secondary winding of the transformer also serve as a modulation reactor, the secondary winding must have a specific minimum inductance while carrying the RF final amplifier plate current. This requires a sizeable core and secondary winding. Thirdly, the modulation transformer must couple each of the primary windings to the secondary winding in an identical manner, both magnetically and capacitatively. In practice, it is virtually impossible to accomplish this balanced coupling while meeting the performance standards presently recognized in the broadcast industry. In all but very low-power transmitters, the massive size of the combination transformer-reactor imposes considerable leakage inductance and capacitance in the system, thereby reducing the bandwidth of the system below acceptable standards.

A considerable improvement has heretofore been provided by separating the modulation transformer and reactor into two separate units and isolating the secondary of the modulation transformer from the RF amplifier plate current by means of a blocking capacitor. While this system permits a sizeable reduction in the mass of the secondary winding and core of the modulation transformer, the blocking capacitor introduces new problems which can be severe in high-power transmitters. These problems include distortion of the audio signal at low frequencies, dangerous low frequency resonance effects, and the discharge under fault conditions of large quantities of energy stored in the blocking capacitor and modulation reactor. In addition with high power transmitters, blocking capacitors can be expensive.

Power tubes introduced in the last several years having multiple grid or control electrodes have been found to be capable of higher operating efficiency when, in addition to conventional plate modulation, the screen is also modulated in phase with the plate modulation. In addition it is considered desireable by some designers to modulate not only the screen and plate of the final RF amplifier stage, but also to modulate the plate and screen of a preceding stage of amplification, such as the driver stage. This necessitates a modulation system having multiple outputs which are in phase throughout the desired frequency range. Such a system is disclosed in my U.S. Pat. No. 3,337, 818, issued Aug. 22, 1967. Unfortunately, this system required the use of a blocking capacitor and is subject to the usual disadvantages encountered therewith.

There is, therefore, a need for a new and improved high level modulation system which overcomes the foregoing and other disadvantages of modulation systems heretofore provided.

SUMMARY AND OBJECTS OF THE INVENTION

The modulation system of the present invention provides means for coupling the output of a modulating audio amplifier to a radio frequency power amplifier, utilizing a modulation transformer and a separate modulation reactor and requiring no blocking capacitor. In addition, means is included for simultaneously modulating multiple electrodes in two or more stages of radio frequency amplification, as desired.

It is in general an object to the present invention to provide an new and improved coupling system for applying the output of a modulating audio amplifier to a radio frequency power amplifier.

Another object of the invention is to provide a coupling system of the above character in which the modulation transformer and modulation reactor are separate units.

Another object of the invention is to provide a coupling system of the above character which requires no blocking capacitor.

A further object of the invention is to provide a coupling system of the above character which includes means for applying the modulating signal to multiple electrodes in one or more stage of radio frequency amplification.

Additional objects and features of the invention will appear from the following description in which the preferred embodiments are set forth in detail in conjunction with the accompanying drawings.

DESCRIPTION OF THE DRAWING

Like reference numerals are used to designate corresponding elements in both figures of the drawing.

DESCRIPTION OF THE PREFERRED EMBODIMENTS

Figure 1:
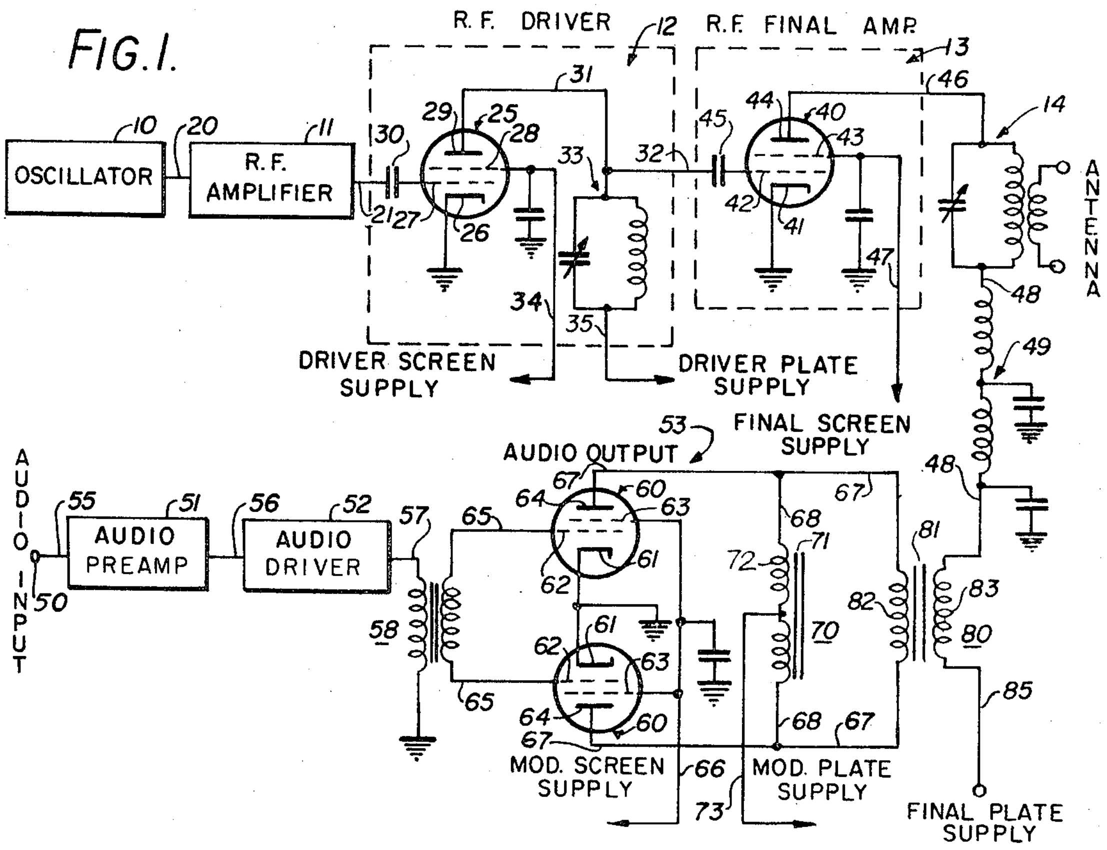
FIG. 1 is a simplified circuit diagram, partially in block form, of an amplitude modulated transmitter having a modulation coupling system embodying the present invention.

As will be apparent to one skilled in the art, the drawing is not a complete circuit diagram of an actual transmitter. Many components such as neutralizing capacitors, parasitic chokes, biasing and filament connections and power supply details have been omitted in order to clearly illustrate the present invention. The term "radio frequency" is used broadly throughout this application to denote all frequencies which can be used for radio communication, including longwave, VHF and UHF frequencies.

The transmitter shown in FIG. 1 comprises generally a radio frequency system, and audio system and means for coupling the output of the audio system to the radio frequency system to provide what is commonly known as a plate modulated radio frequency signal.

The radio frequency system includes an oscillator or radio frequency signal source 10, RF amplifier means 11, RF driver stage 12, Rf final amplifier or output stage 13 and antenna coupling circuit 14.

Oscillator 10 may include any conventional circuit or combination of circuits for generating a radio frequency carrier signal at the operating frequency of the transmitter. The output of oscillator 10 is delivered to the input of radio frequency amplifier 11 by conventional means represented by conductor 20.

Radio frequency amplifier 11 may include a conventional RF amplifying stage or combination of stages for increasing the magnitude of the RF carrier signal to the level required by driver stage 12. the output of RF amplifier 11 is connected by means of a conventional coupling circuit 21 to the input of RF driver 12.

Driver stage 12 includes a tetrode vacuum tube 25 having a cathode 26, control grid 27, screen grid 28 and plate 29. Tetrode 25 is connected as a conventional amplifier, with the output of RF amplifier 11 being applied to driver grid 27 through coupling capacitor 30. The amplified carrier signal appearing at driver plate 29 is applied to RF output stage 13 by means of conductors 31 and 32. Tuned circuit 33 is provided for tuning the output of the driver stage. Screen and plate voltages are supplied to driver stage 12 through conductors 34 and 35, respectively.

RF output stage 13 includes a tetrode vacuum tube 40 having a cathode 41, control grid 42, screen grid 43 and plate 44. Output stage 13 functions as a final RF power amplifier, with the output of driver stage 12 being applied to control grid 42 through coupling capacitor 45. Plate 44 of final amplifier 40 is connected to antenna coupling network 14 through conductor 46. Screen and plate voltages are supplied to the RF output stage through conductors 47 and 48, respectively. A filter network 49 is provided in plate power supply lead 48 to keep RF currents out of the plate power supply.

The audio system includes an input terminal 50, audio preamplifier 51, audio driver 52 and audio output stage 53.

Input terminal 50 may be connected to various signal sources not shown, such as microphones, phonograph pickups, tape heads and the like. Input terminal 50 is connected to preamplifier 51 by conventional circuit 55.

Audio preamplifier 51 may include a conventional amplifier stage or combination of stages for increasing the level of the signal applied to input terminal 50 to the level required by audio driver stage 52. The output of preamplifier 51 is connected to the input of driver stage 52 by means of a conventional coupling circuit 56.

Audio driver 52 may include a conventional audio amplifier, its output being delivered to audio output stage 53 through circuit 57 and transformer 58.

Audio output stage 53 includes a pair of tetrode vacuum tubes 60, each having a cathode 61, control grid 62, screen grid 63 and plate or anode 64. Tubes 60 are connected as a conventional push-pull amplifier, their control grids 62 being connected to transformer 58 by conductors 65. Screen grids 63 are connected to a source of voltage supply by conductors 66. Plates 64 are connected to a modulation transformer 70 and a modulation reactor 80 by conductors 67 and 68.

Modulation transformer 70 includes a magnetic core 71 and a center-tapped winding 72. The two ends of winding 72 are connected to conductors 68 for receiving audio power from audio output tubes 60. The center tap of winding 70 is connected to the modulator plate voltage supply by a conductor 73. As will be apparent to those skilled in the art, transformer 70 functions as an autotransformer, providing a two-to-one step up ratio. Each half of primary winding 72 carries the modulator plate current for one-half of each cycle. In order to assure substantially identical operation during both halves of each cycle, it is important that the two halves of winding 72 have closely matched electrical parameters and that they be coupled together with the specific leakage inductance and winding capacitance required by the particular circuit in which the transformer is used. The proper leakage inductance and capacitance can be provided more readily with this system than with conventional systems using a single modulation transformer-reactor combination or a blocking capacitor.

Modulation reactor 80 includes a magnetic core 81, a primary winding 82 and a secondary winding 83. Windings 82 and 83 are coupled together with the specific values of leakage inductance and winding capacitance required by the circuit in which the transformer is used. The two ends of primary winding 82 are connected to conductors 67 for receiving audio power from audio output tubes 60. The secondary winding 83 is connected in series with the RF final amplifier plate supply. One end of winding 83 is connected to the plate voltage supply by conductor 85, and the other end is connected to final amplifier plate 44 through conductor 48, filter 49, antenna coupling network 14 and conductor 46. Thus, as will be apparent to one skilled in the art, audio voltages induced in secondary winding 83 of modulation reactor 80 are added algebraically to the plate supply voltage to provide plate modulation of the RF final amplifier 13.

In operation of the embodiment shown in FIG. 1, substantially all of the power from audio output stage 53 is delivered to modulation reactor 80 to provide plate modulation of the RF signal in final amplifier 13. It is to be noted that modulation reactor 80 isolates modulation transformer 70 from the DC plate current of the RF final amplifier without requiring the use of a blocking capacitor. Thus, it may be said that primary winding 82 of modulation reactor 80 has taken the place of the conventional blocking capacitor.

Figure 2:
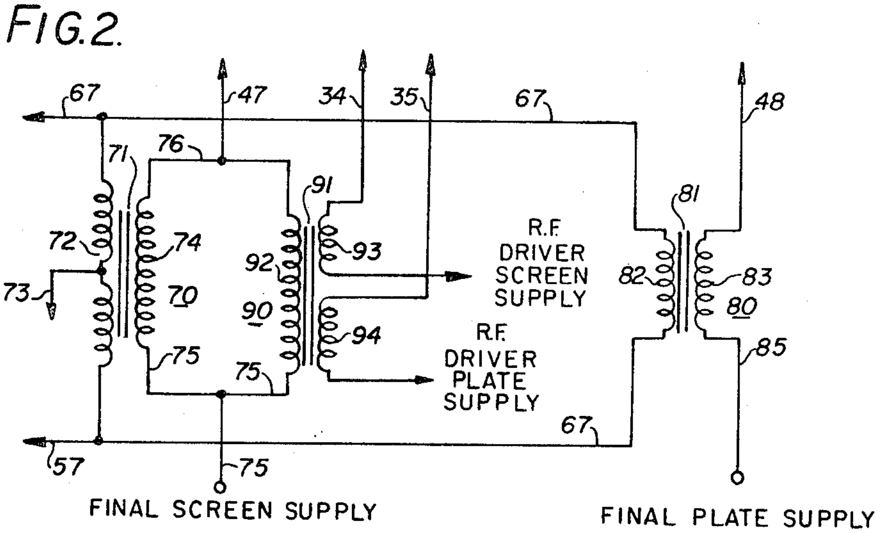
FIG. 2 is a circuit diagram of another embodiment of the present invention which includes means for simultaneously modulating multiple electrodes in one or more stages of RF amplification.

In the embodiment shown in FIG. 2, means is provided for coupling the output of the audio amplifier to multiple electrodes in the RF amplifying stages to provide modulation of these electrodes simultaneously with the plate modulation of the final amplifier. Only the components of the modulation coupling system itself are shown in FIG. 2, the remainder of the circuit being substantially the same as shown in FIG. 1.

In this embodiment, a secondary winding 74 is added to modulation transformer 70. Secondary winding 74 can be a low-power winding and is coupled magnetically to center-tapped winding 72. Secondary winding 74 is shown as being connected to provide screen modulation of RF final amplifier 13. Thus, one end of winding 74 is connected to the final amplifier screen voltage supply by conductor 75, and the other end is connected to screen grid 43 of final amplifier 13 through conductors 76 and 47. Audio voltages induced in secondary winding 74 are thus applied to the screen supply voltage to provide screen modulation in final amplifier 13. As will be apparent to one skilled in the art, secondary winding 74 can alternatively be used to provide modulation of some other electrode in the RF amplifier stages. Likewise, it can be used as a feedback winding, if desired.

Means is also included in the embodiment shown in FIG. 2 for providing plate and screen modulation of RF driver stage 12. This means comprises an auxiliary modulation transformer 90 having a magnetic core 91, a primary winding 92 and at least two secondary windings, 93 and 94 which are magnetically coupled to primary winding 92. The two ends of primary winding 92 are connected to conductors 75 and 76 for receiving the audio signal from the secondary of modulation transformer 70. Secondary winding 93 is connected in series with the driver screen supply by means of conductor 34, and secondary winding 94 is connected in series with the driver plate supply through conductor 35. Thus, audio voltages induced in windings 93 and 94 are added algebraically to the screen and plate supply voltages, respectively, to provide screen and plate modulation for driver stage 12.

As will be apparent to one familiar with the art, the secondary windings of auxiliary modulation transformer 90 can be used for modulating electrodes other than the screen and plate of the RF driver stage, if desired. If no auxiliary modulation is desired, transformer 90 may be omitted.

Operation of this embodiment of the modulation coupling system can be described briefly as follows. Let it be assumed that a radio frequency signal is present in the RF driver and final amplifier stages 12 and 13, and that an audio signal is present in the audio output stage 53. Approximately 90 percent of the power from audio output stage 53 is delivered to modulation reactor 80 to provide plate modulation of the RF signal in final amplifier 13. The remaining 10 percent or so, of the audio output power is diverted through the secondary winding 74 and may be used to provide screen modulation voltage and current for the final amplifier 13. This screen modulation voltage is accurately in phase with the plate modulation voltage provided by modulation reactor 80. Where modulation of the RF signal at the screen and plate of driver stage 12 is desired, a portion of the output of modulation transformer winding 74 is delivered to auxiliary modulation transformer 90 to provide modulation of the driver stage in phase with the modulation of the final amplifier. Ordinarily the windings 93 and 94 of the auxiliary transformer 90 will be used to supply audio power to the electrodes requiring the least power, and the winding 74 will be used to supply power to the second most energetic electrode to be modulated.

It is to be noted that no blocking capacitor is used in the modulation coupling system of the present invention. The elimination of this capacitor solves many of the problems that have arisen in the design and construction of transmitters. The low frequency portion of the passband can be designed to desired parameters without compromising other factors and without inserting dangerous or unwanted side effects into this system. Low frequency resonance and phase shift due to the blocking capacitor are gone, as is the danger of the discharge of the stored energy in the capacitor and reactor under fault conditions. Also, the considerable cost associated with the use of a blocking capacitor is eliminated.

By providing separate modulation transformer and modulation reactor units, the DC plate current of the RF final amplifier is kept out of the modulation transformer, even though no blocking capacitor is used. The only direct current flowing in secondary winding 74 of the modulation transformer is the relatively insignificant screen current of final amplifier 13. Thus, secondary winding 74 can be made relatively small compared with primary winding 72, and the DC amperes and resulting ampere-turns of polarization in secondary winding 74 are minor compared to the corresponding values in primary winding 72. An important result of the light loading of secondary winding 74 is that this winding can easily be coupled to primary winding 72 with any degree of coupling needed. Likewise, closely balanced operation from the two halves of primary windings 72 is easily obtained.

While the final amplifier DC plate current does flow through secondary winding 83 of modulation reactor 80, reactor 80 is provided with a single coil primary 82. Because of the simple function required of coupling between a single coil primary and a single coil secondary, the design and construction of a suitable winding arrangement and core is not a complicated task.

While the modulation coupling system of the present invention has been described with respect to one simplified transmitter circuit, the system can be utilized in almost any amplitude modulated transmitter to obtain better performance than is available with systems heretofore used. The improvement in performance is most significant with high power transmitters; that is, transmitters having a power output on the order of 10 kilowatts or more.

A further improvement in modulation system performance can be realized through proper attention to the output impedance of the high voltage supply which powers the final amplifier. The importance of power supply output impedance in audio performance becomes obvious when one considers that the power supply is connected in series with the audio power circuit and that the audio signal must pass therethrough. In common rectifier circuits, the filter network looks like a highpass filter from the DC output terminals. Also, the filter network can cause serious low frequency distortion due to parallel resonance of the filter choke and capacitor and/or nonlinearity of the filter choke inductance when subjected to heavy AC signals, such as modulation. Furthermore, the filter capacitor and choke can combine with the reactive components in the modulation system to form an unbalanced mesh that is difficult to analyze because of nonlinearity of inductive reactances varying with signal level and frequency.

Elimination of filter chokes from the transmitter power supply can relieve these problems of impedance mismatch, distortion and complex computation and performance at the low frequency end of the audio spectrum. One practical method for eliminating the filter chokes is to use a solid-state rectifier polyphase power supply system, as is discussed in detail in my IEEE Conference Paper, CP 64–507, entitled "AM Transmitter Performance Without Filter Chokes" and my 1964 Wescon Proceedings Paper No. 9.4, entitled "-Semiconductor Rectifier Systems 12 or 18 phase."

It is apparent from the foregoing that I have provided a new and improved modulation coupling system employing pure magnetic coupling provided by two conductively coupled modulation transformers, one serving to combine the push-pull output of the audio amplifier into one complete signal, and the other serving to inductively couple this complete signal to the final RF amplifier anode current. Particularly good performances can be realized by combining this system with a well designed power supply, such as a polyphase rectifier system having an unfiltered ripple voltage on the order of 1 percent or less, in a high-power amplitude modulated transmitter.

I claim:

1. In a system for coupling the output of an audio amplifier to a radio frequency power amplifier in such manner that a radio frequency signal is modulated by the output of the audio amplifier, a modulation reactor having a core with reactor and primary windings wound thereon, said primary winding being electrically connected to the output of said audio amplifier and inductively coupled to said reactor winding, means electrically connecting said reactor winding intermediate said radio frequency amplifier an its plate power supply to provide plate modulation of said amplifier, a separate modulation transformer including a magnetic core and a center-tapped winding, means connecting the two ends of said center-tapped winding to the output of said audio amplifier and directly to the primary winding of said reactor, and means connecting the center tap of said winding to a voltage source.

2. A system as in claim 1 wherein said modulation transformer also includes a secondary winding coupled to said center-tapped winding and adapted for receiving on the order of 10 percent of the output power of said audio amplifier, said secondary winding being connected to an electrode in said radio frequency amplifier to provide auxiliary modulation for said radio frequency amplifier.

3. A system as in claim 1 wherein said modulation transformer also includes a secondary winding coupled to said center-tapped winding and adapted for receiving on the order of 10 percent of the output power of said audio amplifier, together with means connecting the secondary winding of said modulation transformer to a screen grid in the final stage of said RF amplifier to provide screen modulation in phase with said plate modulation.

4. A system as in claim 2 together with additional coupling means for applying a portion of the audio frequency amplifier output to at least one radio frequency amplifying stage prior to the radio frequency final amplifier for modulating the radio frequency signal in said additional radio frequency amplifying stage.

5. A system as in claim 4 wherein said additional coupling means includes an auxiliary modulation transformer having a primary winding and at least one secondary winding, said primary and secondary windings being coupled to each other, means connecting said auxiliary modulation transformer primary winding to the secondary winding of said first-named modulation transformer, and means connecting said auxiliary modulation transformer secondary winding to said additional radio frequency amplifier stage.

6. In a modulation coupling system, a modulation reactor having coupled primary and secondary windings, said primary winding being connected directly to the output stage of a modulating audio amplifier and adapted for receiving a substantial portion of the output of said audio amplifier, and said secondary winding being connected to the final stage of a radio frequency amplifier to provide plate modulation thereof, a separate modulation transformer having magnetically coupled primary and secondary windings, said last-named primary winding being connected directly to the output of said audio amplifier and adapted for receiving a portion of the power output therefrom, said last-named secondary winding being adapted for connection to said radio frequency amplifier to provide auxiliary modulation thereof.

7. In a modulation coupling system, a modulation reactor having coupled primary and secondary windings, the primary winding being connected directly to the output stage of a modulating audio amplifier and adapted for receiving a substantial portion of the output of said audio amplifier and the secondary winding being connected to the final stage of a radio frequency amplifier to provide plate modulation thereof, a separate modulation transformer having magnetically coupled primary and secondary windings, the last-named primary winding being connected directly to the output of said audio amplifier and adapted for receiving a portion of the power output therefrom, and the last-named secondary winding being adapted for connection to said radio frequency amplifier to provide auxiliary modulation thereof, together with an auxiliary modulation transformer having a primary winding connected to the secondary winding of said first named modulation transformer for receiving audio power therefrom and at least one secondary winding magnetically coupled to the primary winding of said auxiliary modulation transformer and electrically connected to a stage of the radio frequency amplifier prior to said final stage to provide modulation of at least one electrode of said prior stage.

8. A modulation coupling system as in claim 7 wherein said auxiliary modulation transformer includes first and second secondary windings, said first secondary winding being adapted for connection to a radio frequency driver stage to provide plate modulation thereof, and said second secondary winding being adapted for connection to said radio frequency driver stage to provide screen modulation thereof.